United States Patent [19]

Preat

[11] Patent Number: 4,931,478

[45] Date of Patent: Jun. 5, 1990

[54] PROCESS FOR THE PREPARATION OF AN EXPANDABLE VINYL PLASTISOL

[75] Inventor: Jean-Luc Preat, Grimbergen, Belgium

[73] Assignee: Solvay & Cie (Societe Anonyme), Brussels, Belgium

[21] Appl. No.: 250,550

[22] Filed: Sep. 29, 1988

[30] Foreign Application Priority Data

Oct. 12, 1987 [FR] France ................ 87 14168

[51] Int. Cl.$^5$ .................................. C08J 9/10
[52] U.S. Cl. ........................... 521/73; 521/82; 521/92; 521/909
[58] Field of Search ............ 521/73, 92, 909

[56] References Cited

U.S. PATENT DOCUMENTS

| | | | |
|---|---|---|---|
| 3,197,423 | 7/1965 | Ackerman | 521/73 |
| 3,305,496 | 2/1967 | Riley, Jr. et al. | 521/73 |
| 3,321,413 | 5/1967 | Riley, Jr. et al. | 521/73 |
| 3,340,209 | 9/1967 | Riley, Jr. et al. | 521/73 |
| 4,029,612 | 6/1977 | Collington . | |

FOREIGN PATENT DOCUMENTS 91346 7/1972 Fed. Rep. of Germany .
2209824 7/1974 France .

OTHER PUBLICATIONS

Chemical Abstracts, vol. 102, 1985, p. 38, No. 204854r, Columbus, Ohio, U.S.; & JP-A-60 06/36 (Akishima Kagaku Kogyo K.K.), 14-01-1985.

*Primary Examiner*—Morton Foelak
*Attorney, Agent, or Firm*—Stevens, Davis, Miller & Mosher

[57] ABSTRACT

Process for the preparation of an expandable vinyl plastisol capable of yielding cellular products containing a nitrogen-based blowing agent and a zinc salt as accelerator of decomposition of the blowing agent. The accelerator, which is preferably zinc chloride, is incorporated in the plastisol in the form of a solution in a liquid carrier.

The process results in cellular products consisting of uniform fine cells without any major change in color.

7 Claims, No Drawings

PROCESS FOR THE PREPARATION OF AN EXPANDABLE VINYL PLASTISOL

The present invention relates to a process for the preparation of an expandable vinyl plastisol and more particularly a class of accelerators of decomposition of the blowing agent employed, and the method of incorporation of these accelerators in the expandable plastisol.

In order to produce cellular structures capable of being employed particularly for the production of coatings such as floor coverings, it is common practice to use plastisols, generally of vinyl type, which contain a blowing agent, generally consisting of a nitrogen-based compound and, in most cases, of carbonamide nitrogen, which decomposes under the effect of heat, releasing nitrogen. It is also common practice to incorporate into such plastisols accelerating agents which lower the decomposition temperature of the blowing agent, such as metal oxides, salts of fatty acids, sulphides, zinc compounds such as zinc oxide, cadmium, lead, ethanolamine, and the like. A class of accelerator which can be found to be of particular interest consists of zinc salts such as zinc nitrate, zinc sulphate and especially zinc chloride, which have the property of greatly reducing the decomposition temperature of the blowing agent. However, when an attempt is made to employ zinc salts and especially zinc chloride as accelerators, it is found that because of their great activity, these can give rise to undesirable secondary effects such as product colouration and even the appearance of a decomposition point. Furthermore, it may happen that they give rise to a nonuniform expansion of the plastisol, resulting in the formation of an irregular cell structure. The subject of the present invention is consequently a process for the preparation of an expandable vinyl plastisol which no longer exhibits the abovementioned disadvantages.

The subject of the present invention is consequently a process for the preparation of an expandable vinyl plastisol capable of yielding cellular products containing a nitrogen-based blowing agent decomposing when heated and a zinc compound as accelerator lowering the decomposition temperature of the said blowing agent, characterized in that the accelerator is a zinc salt and that the accelerator is incorporated in the plastisol in the form of a solution in a liquid carrier.

The process in accordance with the invention is preferably applied to plastisols based on vinyl chloride polymers. Vinyl chloride polymers means vinyl chloride homo- and copolymers, the latter containing at least 50% by weight of vinyl chloride and at least one monomer which is copolymerizable with vinyl chloride. The copolymerizable monomers are those generally employed in the traditiional methods of copolymerization of vinyl chloride. By way of examples there may be mentioned the vinyl esters of mono- and polycarboxylic acids, such as vinyl acetate, propionate and benzoate, unsaturated mono-and polycarboxylic acids such as acrylic, methacrylic, maleic, fumaric and itaconic acids, and their aliphatic, cycloaliphatic and aromatic esters, their amides, and their nitriles, alkyl, vinyl and vinylidene halides, and alkyl vinyl ethers. The vinyl chloride polymers employed within the scope of the present invention are preferably vinyl chloride homopolymers, copolymers of vinyl chloride and vinyl acetate and mixtures of these copolymers with each other or with a vinyl chloride homopolymer.

The expandable vinyl plastisol must obviously contain at least one plasticizer. Plasticizers which are suitable for forming the expandable vinyl plastisol are especially phthalate acid esters such as butyl benzyl phthalate, dioctyl phthalate, dialphanyl phthalate, diisooctyl phthalate, adipic acid esters such as diocytyl adipate, sebacic acid esters such as dioctyl sebacate and phosphoric acid esters such as tricresyl phosphate and octyl diphenyl phosphate. The quantities of plasticizers in the expandable vinyl plastisol can vary within wide limits. The plasticizer may be present, for example, in a proportion of 40 to 100 parts by weight per 100 parts by weight of the polymer. The plasticizer is preferably present in a proportion of 50 to 80 parts by weight per 100 parts by weight of the polymer.

The blowing agent may be any complex organic compound which, on being heated, decomposes with the release of nitrogen and which leaves remaining residues which are compatible with the vinyl plastisol. These materials must have the property of decomposing within a narrow temperature range, which is particularly advantageous when a good cell structure is to be obtained. Examples of blowing agents capable of being used within the scope of the present invention are azodicarbonamide, barium azodicarboxylate, p,p'-oxybis(benzenesulphonyl hydrazide) and p,p'-oxybis(benzenesulphonyl semicarbazide). For reasons of economy, it is generally preferred to use azodicarbonamide.

The quantity of blowing agent in the plastisol can vary depending on the desired degree of expansion. The blowing agent is advantageously employed in a proportion of 1 to 20 parts by weight per 100 parts by weight of the polymer. The blowing agent, for example azodicarbonamide, is preferably employed in a proportion of 1 to 5 parts by weight per 100 parts by weight of polymer.

The zinc salt may be particularly zinc nitrate or sulphate, but the use of zinc chloride is nevertheless preferred.

Depending on the temperature at which the blowing agent is intended to decompose, the zinc salt is incorporated in a proportion of 0.05 to 2 parts by weight per 100 parts by weight of the polymer or of the polymers present in the plastisol.

The plastisol may additionally comprise the usual additives such as especially stabilizers suitable for reducing the decomposition of the polymer under the effect of heat and light, pigments or colorants, and fillers.

In the process in accordance with the invention, the zinc salts, which are generally in a crystalline solid form, must be predissolved in a liquid carrier. To the extent that the zinc salts are soluble in liquid carriers, the best results are obtained by employing the accelerator in the form of a solution. This solution must be sufficiently compatible with the expandable vinyl plastisol. Suitable solvents are ketones such as tetrahydrofuran, cyclohexanone and methyl ethyl ketone, esters such as ethyl acetate, chlorinated hydrocarbons such as ethylene dichloride and methylene chloride, and water. The zinc salt is preferably employed in aqueous solution. The zinc salt is dissolved in water in a proportion of 50 to 200 parts by weight per 100 parts by weight of water.

It has been found, furthermore, that when the expandable vinyl plastisol contains a copolymer of vinyl chloride and of vinyl acetate, the quality of the cellular products obtained according to the process of the invention can also be appreciably improved by incorporating a polyol in the expandable plastisol. The polyol employed is preferably a triol and may be glycerol, bistrimethylolpropane or a mixture of both. The polyol is employed in a proportion of 0.1 to 1.5 parts by weight per 100 parts by weight of the polymer.

The preparation of the expandable vinyl plastisols is generally carried out in a mixer of conventional type which may be a planetary mixer or a turbine mixer. If necessary, the expandable vinyl plastisol obtained is subjected to a filtration through a screen or a refining operation by a pass through a three-roll mill and, if appropriate, to a debubbling operation under reduced pressure. The expandable vinyl plastisol thus prepared is ready for use in the manufacture of coatings by means of a coating operation.

To produce the desired cellular structure, the plastisol, pregelled with the application of heat, may be heated in various ways, for example by passing through a hot air oven or by means of apparatus using infrared radiation. The expandable vinyl plastisol is heated to a temperature above the decomposition of the blowing agent in the presence of the accelerator, and preferably to 140°-210° C. The time for which the vinyl plastisol is heated depends on the temperature and on the desired degree of decomposition of the blowing agent. This time is preferably from 10 to 300 seconds.

The invention is illustrated, furthermore, by the Examples of practical implementation which are given below.

EXAMPLE 1

An expandable vinyl plastisol whose composition in parts by weight is as follows is prepared:

| | |
|---|---|
| Poly(vinyl chloride) | 100 |
| Di-2-ethylhexyl phthalate | 70 |
| Calcium carbonate | 25 |
| Titanium dioxide | 3 |
| Azodicarbonamide marketed by Schering Chemicals Co. under the trademark Genitron ACSP4 | 3 |
| Zinc chloride in aqueous solution in a proportion of 5 parts by weight of zinc chloride per 3 parts of water. | 0.40 |

After introducing the aqueous solution of zinc chloride into the vinyl plastisol, the whole is heated to 200° C. to produce the expansion of the vinyl plastisol. The thickness of the plastisol layer which, before swelling, was 1 mm, changes to 2.7 mm after 1 minute's heating. After 1 min 30 s of heating, the thickness becomes 4.8 mm and after 2 minutes, the thickness reaches 5.2 mm. The cellular product obtained consists of uniform fine cells and exhibits a uniform white colour. The yellowness value (YV) of the cellular material obtained is then determined by means of a photometer using the relationship $$YV = \frac{R - B}{G}$$

in which R, B and G denote the reflectance in red, blue and green light respectively, expressed in % relative to barium sulphate. The cellular product obtained has a yellowness value equal to 12. The predissolution of zinc chloride in a minimum quantity of water before the introduction to the plastisol according to the invention thus eliminates the problem of the appearance of brown points and enhances the effectiveness of this accelerator.

EXAMPLE 2

An expandable vinyl plastisol whose composition in parts by weight is as follows is prepared:

| | |
|---|---|
| Copolymer of vinyl chloride and vinyl acetate containing 4% by weight of vinyl acetate | 75 |
| Poly(vinyl chloride) | 25 |
| Di-2-ethylhexyl phthalate | 60 |
| Butyl benzyl phthalate | 10 |
| Calcium carbonate | 50 |
| Azodicarbonamide marketed by Schering Chemicals Co. under the trademark Genitron AC4 | 1.7 |
| Zinc chloride in aqueous solution containing 5 parts by weight of zinc chloride per 3 parts by weight of water. | 0.8 |

After introducing the aqueous solution of zinc chloride into the vinyl plastisol, the whole is heated to 170° C. for 3 minutes to produce the expansion of the vinyl plastisol. The thickness of the plastisol layer which, before swelling, was 0.5 mm, changes to 1.25 mm. The degree of expansion is equal to 2.5 and the density after expansion is 0.49 g/cm$^3$. A cellular product consisting of uniform fine cells is formed. The yellowness value measured as in Example 1 is 39.

EXAMPLE 2R

This example is given by way of comparison. Example 2 was repeated, but using zinc chloride as such, that is to say not predispersed in water, in a proportion of 0.5 part by weight. The whole is heated to 170° C. for 3 minutes to produce the expansion of the vinyl plastisol. The thickness of the plastisol layer which, before swelling, was 0.5 mm, changes to 1.25 mm. The degree of expansion is equal to 2.3 and the density after expansion is 0.55 g/cm$^3$. It is found, however, that the introduction of zinc chloride in the form of crystals produces a brownish colouration and many local decomposition points due to a poor distribution of zinc chloride.

EXAMPLE 3

Example 2 was repeated, but with the additional introduction of 0.5 part by weight of bistrimethylolpropane at the beginning.

The whole is heated to 170° C. for 3 minutes to produce the expansion of the vinyl plastisol. The thickness of the plastisol layer which, before swelling was 0.5 mm, changes to 1.30 mm. A cellular product consisting of uniform fine cells and of good initial colour is formed. The yellowness value, measured as in Example 1, is 24.

EXAMPLE 4

Example 2 was repeated, but with the additional incorporation of 0.5 part by weight of glycerol into the composition.

The whole is heated to 170° C. for 3 minutes to produce the expansion of the vinyl plastisol. The thickness of the plastisol layer which, before swelling was 0.5 mm, changes to 1.65 mm. The yellowness value, measured as in Example 1, is 35. The incorporation of glycerol into the expandable vinyl plastisol improves the accelerating effect of zinc chloride.

EXAMPLE 5

Example 2 was repeated, but with additional incorporation of 0.3 part by weight of glycerol and 0.3 part by weight of bistrimethylolpropane into the composition.

After heating to 170° C. for 3 minutes, the thickness of the plastisol layer changes from 0.5 mm to 1.90 mm. The degree of expansion is 3.8. The yellowness value is 27. The incorporation of glycerol and of bistrimethylpropane into the expandable vinyl composition according to the invention improves the effectiveness of zinc chloride as an accelerator of decomposition of the blowing agent and gives a cellular product which is free from an undesired colouration.

I claim:

1. Process for the preparation of an expandable vinyl plastisol capable of yielding cellular products comprising a nitrogen-based blocking agent decomposing when heated and a zinc compound as accelerator lowering the decomposition temperature of the blowing agent, wherein said zinc compound is a zinc salt incorporated into the plastisol in the form of an aqueous solution.

2. Process according to claim 1, wherein the blowing agent is azodicarbonamide.

3. Process according to claim 1, wherein the zinc salt is zinc chloride.

4. Process according to claim 1, wherein the expandable plastisol consists of a resin based on vinyl chloride.

5. Process according to claim 4, wherein the expandable plastisol contains a copolymer of vinyl chloride and of vinyl acetate.

6. Process according to claim 5, wherein a polyol is additionally incorporated in the plastisol.

7. Process according to claim 6, wherein the polyol is chosen from the group consisting of glycerol, bistrimethylolpropane and mixtures thereof.

* * * * *